United States Patent [19]

Hansen

[11] Patent Number: 4,655,099
[45] Date of Patent: Apr. 7, 1987

[54] NOISELESS STEPPER MOTOR

[75] Inventor: Charles W. Hansen, Wolcott, Conn.

[73] Assignee: Tri-Tech, Incorporated, Waterbury, Conn.

[21] Appl. No.: 705,748

[22] Filed: Feb. 26, 1985

[51] Int. Cl.⁴ .......................... F16H 1/12; F16H 1/20
[52] U.S. Cl. .................................. 74/421 A; 248/606; 248/638
[58] Field of Search ................. 310/91; 74/421 A; 248/638, 635, 634, 609, 606

[56] References Cited

U.S. PATENT DOCUMENTS

| | | | |
|---|---|---|---|
| 1,935,686 | 11/1933 | Whitehead et al. | 74/421 R |
| 2,074,136 | 3/1937 | Welch | 248/606 |
| 2,505,959 | 5/1950 | Grosh | 248/606 |
| 2,600,697 | 6/1952 | Schmitter | 74/421 A |
| 2,620,151 | 12/1952 | Peters | 248/606 |
| 2,652,997 | 9/1953 | Ballman | 248/606 |
| 2,670,794 | 3/1954 | Gallagher | 74/421 R |
| 2,772,760 | 12/1956 | Van Lieshout . | |
| 2,832,905 | 4/1958 | Clay | 310/90 |
| 3,330,515 | 7/1967 | Janssen et al. | 248/606 |
| 3,370,189 | 2/1968 | Haydon et al. . | |
| 3,422,695 | 1/1969 | Wilson et al. | 74/421 A |
| 3,495,107 | 2/1970 | Haydon . | |
| 3,671,841 | 6/1972 | Hoffmann . | |
| 3,699,282 | 10/1972 | Jepson et al. . | |
| 3,857,053 | 12/1974 | Yatsushiro et al. . | |
| 3,941,339 | 3/1976 | McCarty | 310/91 |
| 4,061,936 | 12/1977 | Woolley . | |
| 4,082,972 | 4/1978 | Gerber et al. . | |
| 4,147,071 | 4/1979 | Scribner et al. | 74/421 A |
| 4,241,270 | 12/1980 | Haydon et al. . | |
| 4,274,026 | 6/1981 | Haydon et al. . | |
| 4,471,935 | 9/1984 | Chiba et al. | 284/638 |
| 4,520,987 | 6/1985 | Eguchi et al. | 310/91 |
| 4,568,243 | 2/1986 | Schubert et al. | 248/638 |

Primary Examiner—Leslie A. Braun
Assistant Examiner—D. M. Wright
Attorney, Agent, or Firm—Lee C. Robinson, Jr.

[57] ABSTRACT

A mounting plate assembly has provisions for reducing the motor noise transmission from a DC stepper motor or the like that has an associated reducing gear assembly. The mounting plate assembly is formed of a front plate which provides the bushings for the shafts of the reducing gears and on which an output bearing is mounted for journalling an output shaft. A generally discoid inner mounting plate of a first diameter is affixed adjacent the front plate and serves as a mount for holding the retaining cup or the overall stepper motor and gear assembly. An outer mounting plate, which has a second diameter smaller than the first diameter, serves for mounting the overall assembly in place, and has an aperture, favorably provided with a sleeve, coaxial with the output bearing. In order to provide acoustic isolation, a layer of resilient rubber is vulcanized in place between the inner and outer mounting plates. A portion of the gasket fills the annulus between the output bearing and the sleeve. This structure reduces the output noise from about 50 dB to about 31 dB. In other embodiments a suitable pressure sensitive or thermal sensitive adhesive may be substituted for the layer of resilient rubber.

14 Claims, 4 Drawing Figures

NOISELESS STEPPER MOTOR

This invention relates to electric rotating machines and more particularly to electric motors such as stepper motors and synchronous motors. The invention is more specifically directed to a "silent" stepper, i.e., reduced-noise arrangement for mounting and coupling such a motor to the apparatus that it is to drive.

A line of electric motors has been developed which are suitable for use as steppers or synchronous motors and which are relatively compact but exhibit substantial output torque. Representative motors of this type are disclosed, for example in A. W. Haydon and John J. Dean U.S. Pat. Nos. 4,241,270, granted Dec. 23, 1980, and 4,274,026, granted June 16, 1981. Further motors of this type are disclosed for example, in A. W. Haydon U.S. Pat. Nos. 3,495,113 granted Feb. 10, 1970, 3,495,111 also granted Feb. 10, 1970, 3,564,214 granted Feb. 16, 1971, 3,909,646, granted Sept. 30, 1975, and 4,004,168 granted Jan. 18, 1977; A. W. Haydon and John J. Dean U.S. Pat. No. 3,770,998 granted Nov. 6, 1973; and A. W. Haydon U.S. Pat. No. 4,087,709 granted May 2, 1978. The motors can be of cylindrical configuration and can utilize a two-pole rotor and a plurality of salient stator poles arranged around the rotor to provide a nonuniform air gap therebetween. Certain of the stator poles can be shaded, and this feature, together with the nonuniform air gap, results in a motor which begins rotating substantially instantaneously in response to the energization of the surrounding field coil. These features are thoroughly discussed in the above U.S. patents, and reference should be made to them for a detailed understanding of their construction and operation.

The motors can be of a single-phase or of a multiple-phase type, and two-phase stepper motors are often employed.

D.C. stepper motors often find favorable application in automobiles to perform any of various functions where a precise, controlled movement is required, such as in the control of fuel supply and in the operation of emission control equipment.

These stepper motors operate intermittently and usually at high motor torques, so a high degree of noise occurs on their operation. Because of the mechanized gear linkage between the motor and the driven equipment, a large fraction of this noise is transmitted to the passenger compartment of the automobile. The automotive industry has aimed at reducing this noise, which is usually around 50 dBA, to an acceptable level of not more than 43 dBA. Unfortunately, previous attempts to mask or prevent this motor noise have not achieved a sufficient reduction in the audible noise level.

Accordingly, it is an object of this invention to produce an electric rotating machine, to wit, a DC stepper motor, that avoids the drawbacks and shortfalls of the prior art.

It is a more specific object of this invention to provide a DC stepper motor assembly in which the motor noise is reduced at least down to a noise level regarded as an acceptable maximum, and preferably well below that level.

A more particular object of the invention is to provide a motor assembly in which a mounting plate for the motor is acoustically separated from the frame of the motor assembly so that motor noise is prevented from being transmitted, but is dissipated.

In accordance with a wide range of possible preferred embodiments of this invention, a rotating machine assembly is formed basically of an electric rotating machine having a rotor, with a rotor pinion affixed thereon, a reducing gear assembly, with a first of the reducing gears thereof being meshed with the rotor pinion and a final reducing gear having its shaft arranged as an output shaft, and a casing or retaining cup over the electric machine and the reducing gear assembly. A mounting plate assembly is provided, upon which the retaining cup is mounted. This assembly comprises a front plate having sufficient bushings for the reducing gear shafts and an output bearing journalling the output shaft. In suitable embodiments, an output pinion is mounted on the output shaft. A first, or inner mounting plate is affixed adjacent the front plate and, being of generally round or discoid shape, has a first diameter. A second, or exterior mounting plate, also favorably discoid in shape, has a second diameter smaller than the first diameter, so as to accommodate the mounting of the retaining cup onto the first mounting plate. On the second mounting plate a collar or sleeve is disposed coaxially over the output bearing and this collar defines an annulus between it and the output bearing. Mounting means, favorably ears or tabs, can extend radially outward from the exterior mounting plate.

In order to achieve quiet operation acoustic isolation is maintained between the interior and exterior plates. This is attained by a layer of resilient material, e.g., rubber, affixed between the two plates. This can be a rubber gasket vulcanized in place. In many preferred embodiments, an annular portion of this rubber pad or gasket extends into the collar and fills the annulus between the collar and the output bearing. In other embodiments a suitable pressure sensitive or thermal sensitive adhesive may be substituted for the layer of resilient rubber.

The mounting plate assembly constructed according to several embodiments of this invention isolates noise from the exterior mounting plate. It has been found that a stepper motor constructed according to a preferred embodiment of this invention has a noise level reduced by as much as 19 dB, as compared to a corresponding similar stepper motor assembly without the improvements of this invention.

The present invention, as well as further objects, features, and advantages thereof, will be understood more clearly and fully from the ensuing description of a preferred embodiment, when read in conjunction with the accompanying drawings, in which FIG. 1 is a general side elevational view of a stepper motor assembly according to an embodiment of this invention;

Figure 1:
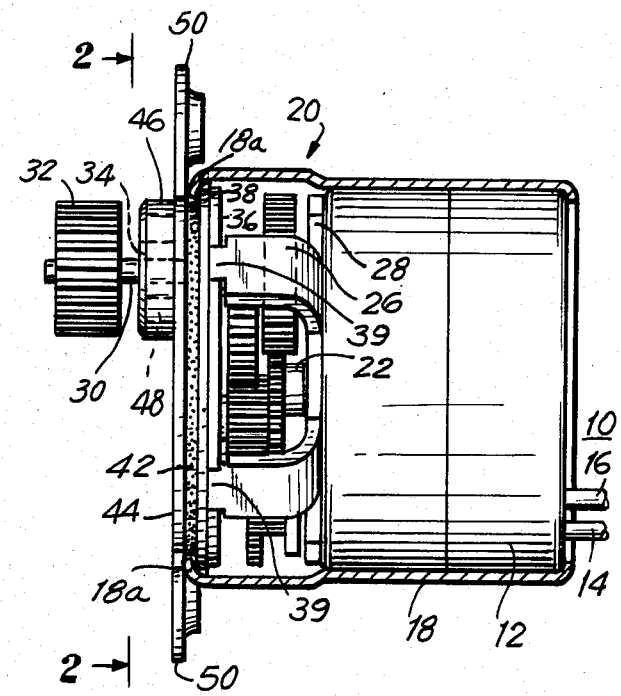

With reference to the drawings, and with initial emphasis being given to FIG. 1, a stepper motor assembly 10 is shown to include a DC stepper motor 12, which can be of the type mentioned in the above-referenced patents, and having leads 14 and 16 extending out the rearward side of a retaining cup 18 or casing. The latter extends forward over a gear box, or reducing gear train 20. In the gear box 20, a rotor shaft 22 of the motor 12, which has affixed thereupon a rotor pinion (obscured in the drawing) communicates with an initial one of shaft-mounted gears which make up the gear train 20. A frame 26 mounted on a back plate 28 extends outward and around the gears.

Figure 2:
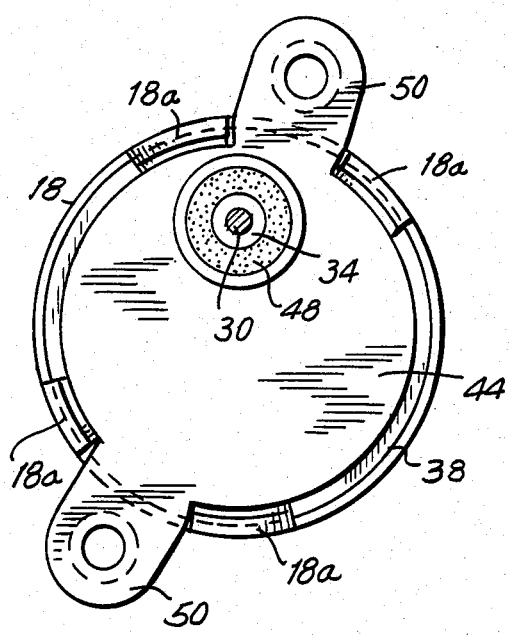
FIG. 2 is a plan view of the mounting plate assembly of this embodiment, taking along the plane 2—2 of FIG. 1.
Figure 3:
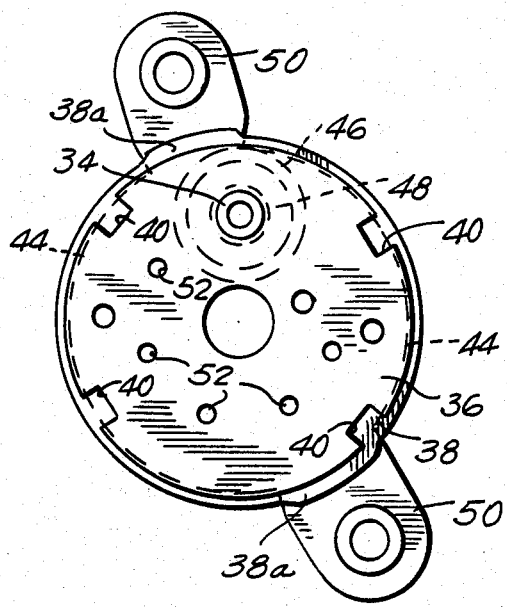
FIG. 3 is a rear plan view of the mounting plate assembly of FIG. 2.
Figure 4:
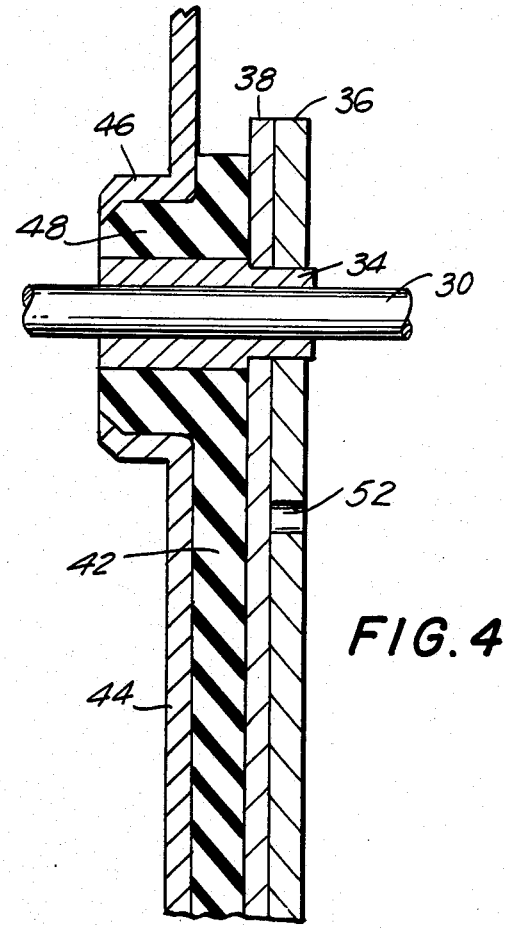
FIG. 4 is a partial cross-sectional view showing details of the mounting plate assembly.

A final one of the gears drives an output shaft 30, on which is mounted an output pinion 32. The shaft 30 is journalled in an output bearing 34 that is affixed in an aperture of a front plate 36. This feature is best seen in FIGS. 3 and 4. The front plate 36, of generally circular shape, is affixed onto an interior mounting plate 38, of similar shape and diameter. A tooth 39 at the end of each frame leg of the gear box frame 26 mates with a respective cutout 40 in the front plate 36, as shown in FIG. 3. Here, there are four such cutouts 40 disposed generally symmetrically on the edge of the front plate 36. A rubber pad or gasket 42 joins the interior mounting plate 38 with an exterior mounting plate 44, best shown in FIG. 2. The diameter of this plate 44 is smaller than the diameter of the front plate 36 or of the interior mounting plate 38. This permits the retaining cup 18 to be mounted directly to the interior mounting plate 38 without also being joined directly to the exterior mounting plate 44. The reduced diameter of the rubber pad 42 and the exterior mounting plate 44 permits mounting ears 18a of the retaining cup 18 to be appropriately joined or staked to the interior mounting plate 38. The latter plate 38 has approximately the same diameter as the inside diameter of the retaining cup. As shown in FIG. 3, a pair of protruding arcs 38a extend outward about 0.20 inches beyond the disk of the interior mounting plate 38. These protruding arcs 38a permit alignment of the leads 14 and 16 with respect to the position of the output pinion 32, i.e., the arcs 38a each fit between adjacent ears 18a of the retaining cup 18 to prevent rotation of the retaining cup 18 with respect to the mounting plate 36.

A collar 46 formed on the exterior mounting plate 44 surrounds the bearing 34 and defines an annular region between itself and the bearing 34. As shown in FIG. 4, an annular portion 48 of the rubber pad or gasket 42 extends into and fills this annular zone, and supports the bearing 34 while isolating it acoustically from the exterior mounting plate 44. Here, the inside diameter of the collar 46 is about twice the diameter of the output bearing 34.

In this embodiment, a pair of mounting ears 50 extend radially outward from the circumference of the exterior mounting plate. Each of these mounting ears has a mounting aperture disposed generally centrally thereon for receiving a bolt or machine screw. Here, these apertures are generally in alignment with the axis of the rotor shaft 30.

As shown in FIGS. 3 and 4, the front plate 36 has a plurality of circular apertures 52, and these each terminate at the mounting plate 38. These apertures 52 serve as bushings for respective shafts of the gears 24. Similar apertures (not shown) are provided in the back plate 28.

With an arrangement according to an embodiment of this invention, the noise level is reduced from 50 dBA to about 31 dBA, as compared with an unimproved arrangement. This is accomplished because the resilient rubber gasket or pad 42 isolates the noise from the mounting ears 50.

While the assembly of this invention is illustrated with respect to a stepper motor, it should be understood that the principles of this invention could be carried out likewise with an AC synchronous motor, or with any of a variety of other types of electric rotating machines. Moreover, the overall shape of the mounting plate assembly need not be discoid or circular, as shown. Further, means for mounting the mounting plate are not limited to the radially-extending mounting ears 50, but such mounting means can be adapted, as necessary, to suit any particular use. In other words, although this invention has been illustrated with respect to a specific embodiment, the invention is not limited only to such an embodiment, and many modifications and variations thereof would present themselves to those skilled in the art without departure from the scope and spirit of this invention, as defined in the appended claims.

What is claimed is:

1. A rotating machine assembly comprising:
    an electric rotating machine having a rotor, with a rotor pinion affixed thereon;
    a reducing gear assembly having at least one reducing gear, each such gear having a respective shaft, with an initial reducing gear thereof being meshed with said pinion and a final reducing gear having its shaft arranged as an output shaft;
    a casing over said electric rotating machine and at least a portion of said reducing gear assembbly;
    means providing sufficient bushings for said reducing gear shafts and an output bearing journalling said output shaft;
    a first mounting plate, the casing being mounted onto said first mounting plate;
    a second mounting plate having portions to accommodate the mounting of said casing on said first mounting plate, with an aperture coaxial with said output bearing, and including mounting means and a collar in spaced coaxial relationship with said bearing; and
    a layer of resilient material disposed between said first and second mounting plates and affixed thereto, said layer or resilient material including an annular extension forming a bushing disposed between said output shaft and said collar to coaxially surround and isolate said output shaft from said collar, for acoustically isolating said first and second mounting plates, as well as said output shaft and said output bearing.

2. A rotating machine assembly according to claim 1, wherein said aperture is about twice as wide as said output bearing.

3. A rotating machine assembly comprising:
    a stepper motor having a rotor shaft, with a pinion affixed thereon;
    a reducing gear assembly having a plurality of reducing gears, each such gear having a respective shaft, with a first reducing gear thereof being meshed with said pinion and a final reducing gear having its shaft arranged as an output shaft;
    a casing over said electric rotating machine and at least a portion of said reducing gear assembly;
    means providing sufficient bushings for said reducing gear shafts and an output bearing journalling said output shaft;
    a first mounting plate having a first diameter, the casing being mounted on said first mounting plate;
    a second mounting plate having a second diameter less than said first diameter, with an aperture coaxial with said output bearing, and including mounting elements extending therefrom and a collar in spaced coaxial relationship with said bearing; and a layer of resilient material disposed between said first and second mounting plates and affixed thereto, said layer of resilient material including an annular extension forming a bushing disposed between said output shaft and said collar coaxially surround and isolate said output shaft and said collar, for acoustically isolating said first and second mounting plates, as well as said output shaft and said output bearing.

4. A rotating machine assembly comprising:
a stepper motor having a rotor shaft, with a pinion affixed thereon;
a reducing gear assembly having a plurality of reducing gears, each such gear having a respective shaft, with an initial reducing gear being meshed with said pinion and a final reducing gear having its shaft arranged as an output shaft;
a casing over said electric rotating machine and at least a portion of said reducing gear assembly;
end plate means providing sufficient bushings for said reducing gear shafts and an output bearing journalling said output shaft;
a first mounting plate supporting said end plate means and having a first diameter, the casing being mounted on said first mounting plate;
a second mounting plate having a second diameter less than said first diameter, including a collar disposed coaxially over said output bearing and defining an annulus therebetween, and including mounting ears extending therefrom; and
a layer of resilient material disposed between said first and said second mounting plates and affixed thereto, said material including an annular extension filling said annulus, for acoustically isolating said first and second mounting plates, as well as said output shaft and said output bearing.

5. A rotating machine assembly according to claim 4, wherein said collar has an inside diameter about twice that of the output bearing.

6. A rotating machine assembly comprising:
an electric rotating machine having a rotor shaft, with a rotor pinion affixed thereon;
a reducing gear assembly having a plurality of reducing gears, each such gear having a respective shaft, with an initial reducing gear being meshed with said rotor pinion and a final reducing gear having its shaft arranged as an output shaft;
a casing over said electric rotating machine and at least a portion of said reducing gear assembly;
a front plate having sufficient bushings for said reducing gear shafts and an output bearing journalling said output shaft;
a first mounting plate affixed adjacent said front plate and having a first diameter, the casing being mounted on said first mounting plate;
a second mounting plate having a second diameter less than said first diameter, including a collar disposed coaxially over said output bearing and defining an annulus therebetween, and the second mounting plate also including mounting elements extending therefrom; and
a layer of resilient material disposed between said first and said second mounting plates and affixed thereto, said material including an annular extension filling said annulus, for acoustically isolating said first and second mounting plates, as well as said output shaft and said output bearing.

7. A rotating machine assembly comprising:
an electric rotating machine having a rotor, with a rotor pinion affixed thereon;
a reducing gear assembly having at least one reducing gear, each such gear having a respective shaft, with an initial reducing gear being meshed with said rotor pinion and a final reducing gear having its shaft arranged as an output shaft;
a casing over said electric rotating machine and at least a portion of said reducing gear assembly;
end plate means providing sufficient bushings for said reducing gear shafts and an output bearing journalling said output shaft;
a first mounting plate supporting said end plate means and having a first diameter, the casing being mounted on said first mounting plate;
a second mounting plate having a second diameter less than said first diameter, having an aperture coaxial with said output bearing, and including mounting elements extending therefrom and a collar in spaced coaxial relationship with said bearing; and
an acoustic isolation layer, comprised of rubber vulcanized in place between said first and said second mounting plates, further comprising an annular extension forming a bushing disposed between said output shaft and said collar coaxially surround and isolate said output shaft from said collar, for acoustically isolating said first and second mounting plates, as well as said output shaft and said output bearing.

8. A rotating machine assembly comprising:
an electric rotating machine having a rotor, with a rotor pinion affixed thereon;
a reducing gear assembly having at least one reducing gear, each such gear having a respective shaft, with a first reducing gear being meshed with said rotor pinion and a final reducing gear having its shaft arranged as an output shaft;
a casing over said electric rotating machine and said reducing gear assembly;
a front plate having sufficient bushings for said reducing gear shafts and an output bearing journalling said output shaft;
a first mounting plate affixed adjacent said front plate and having a first diameter, the casing being mounted on said first mounting plate;
a second mounting plate having a second diameter less than said first diameter, including a collar disposed coaxially over said output bearing and defining an annulus therebetween, and including mounting ears extending from said second mounting plate; and
an acoustic isolation layer of vulcanized rubber in place between said first and said second mounting plates, with an annular portion thereof filling said annulus, for acoustically isolating said first and second mounting plates, as well as said output shaft and said output bearing.

9. A mounting plate assembly for use in conjunction with a DC stepper motor or the like having a reducing gear assembly coupled thereto, the reducing gear assembly having a plurality of shaft-mounted reducing gears and an output shaft; the mounting plate assembly comprising a front plate provoding sufficient bushings for the shafts of said reducing gears; an output bearing mounted in said front plate for journalling said output shaft; an inner mounting plate adjacent said front plate and suitably shaped for serving as a mount for holding a casing of the stepper motor and the associated reducing gear assembly; an outer mounting plate with an aperture coaxial with said output gearing, and including a collar coaxial to said aperture and mounting elements extending therefrom; and a layer of resilient material disposed between said inner and said outer mounting plates and affixed to them, said layer of resilient material including an annular extension forming a bushing disposed between said output shaft and said collar to coaxially surround and isolate said output shaft from said collar, for acoustically isolating said inner and said outer mounting plates, as well as said output shaft and said output bearing.

10. A mounting plate assembly according to claim 9, wherein said outer mounting plate aperture has a diameter about twice that of said output bearing.

11. A mounting plate assembly for use in conjunction with a DC stepper motor or the like having a reducing gear assembly coupled thereto, the reducing gear assembly having a plurality of shaft-mounted reducing gears and an output shaft; the mounting plate assembly comprising a front plate providing sufficient bushings for the shafts of said reducing gears; an output bearing mounted in said front plate for journalling said output shaft; a generally circular inner mounting plate affixed adjacent said front plate and having a first diameter the inner mounting plate serving as a mount for holding a casing of the stepper motor and the associated reducing gear assembly; a generally circular outer mounting plate having a second diameter less than said first diameter and with an aperture coaxial with said output bearing, and including a collar coaxial to said aperture and mounting elements extending therefrom; and a layer of resilient material disposed between said inner and said outer mounting plates and affixed thereto, said layer of resilient material including an annular extension forming a bushing disposed between said output shaft and said collar to coaxially surround and isolate said output shaft from said collar, for acoustically isolating said inner and said outer mounting plates, as well as said output shaft and said output bearing.

12. A mounting plate assembly according to claim 11, wherein said layer of resilient material consists of a rubber pad vulcanized in place between said inner and said outer plates and extending about said output shaft to fill in the space between said output shaft and said collar.

13. A mounting plate assembly for use in conjunction with a DC stepper motor or the like having a reducing gear assembly coupled thereto, the reducing gear assembly having a plurality of shaft-mounted reducing gears and an output shaft; the mounting plate assembly comprising a front plate providing sufficient bushings for the shafts of said reducing gears; an output bearing affixed on said front plate for journalling said output shaft; a generally circular inner mounting plate affixed adjacent said front plate and having a first diameter, the inner mounting plate serving as a mount for holding a casing of the stepper motor and the associated reducing gear assembly; a generally circular outer mounting plate having a second diameter less than said first diameter and including a collar disposed coaxially over said output bearing and defining an annulus therebetween; and an acoustic isolation layer of vulcanized rubber in place between said inner and said outer mounting plates, with an annular portion filling said annulus, for acoustically isolating said first and second mounting plates, as well as said output shaft and said output bearing.

14. A mounting plate assembly according to claim 13, wherein said collar has an inside diameter about twice that of said output bearing.

* * * * *